United States Patent Office 3,314,220
Patented Apr. 18, 1967

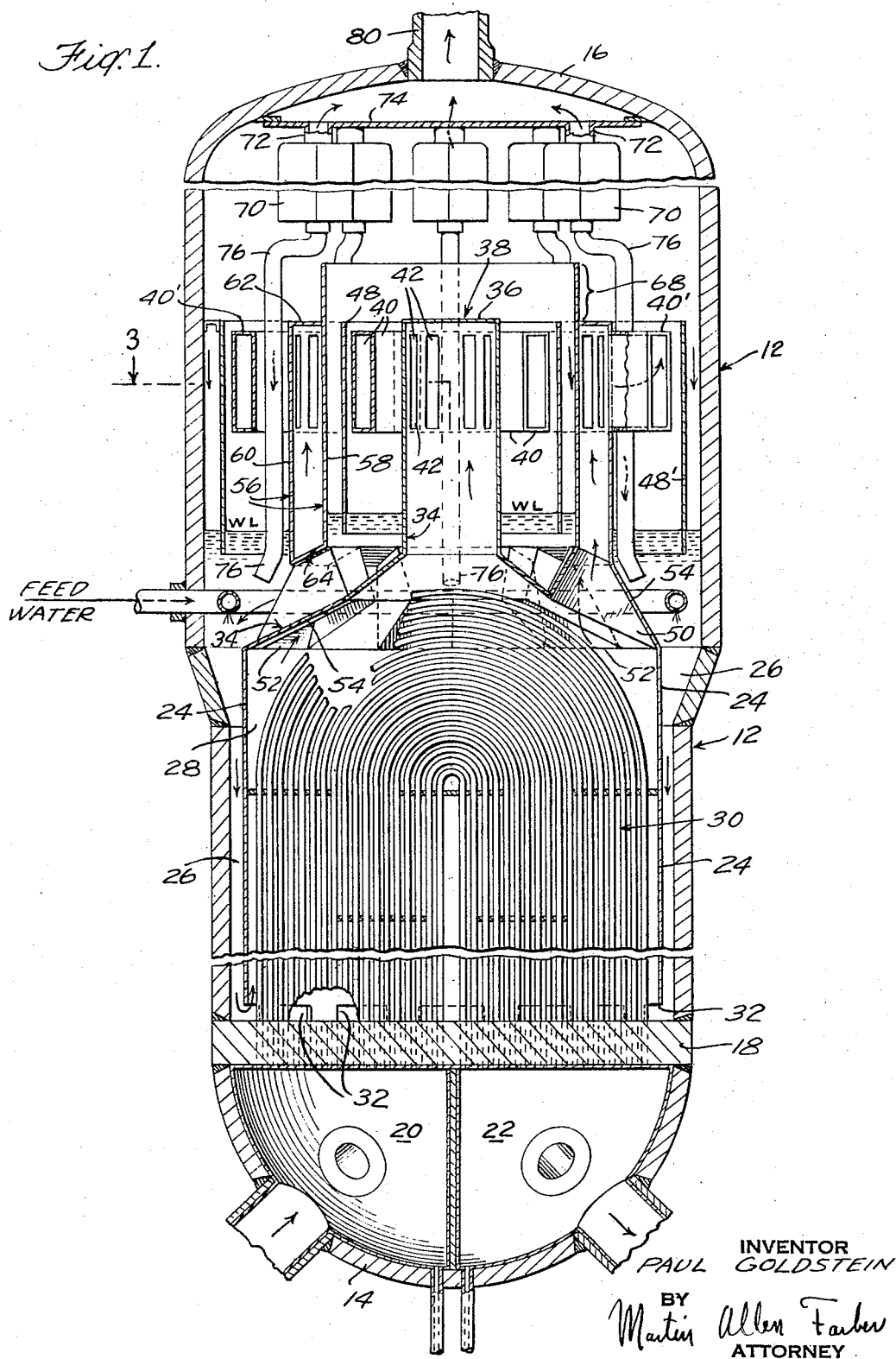

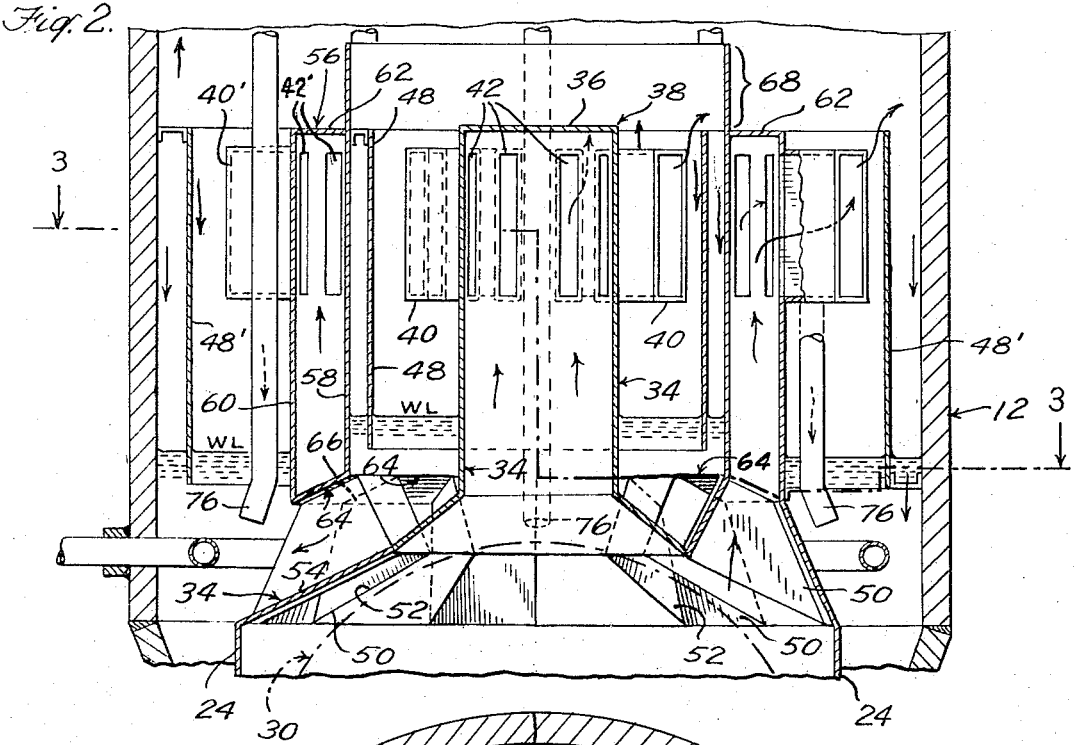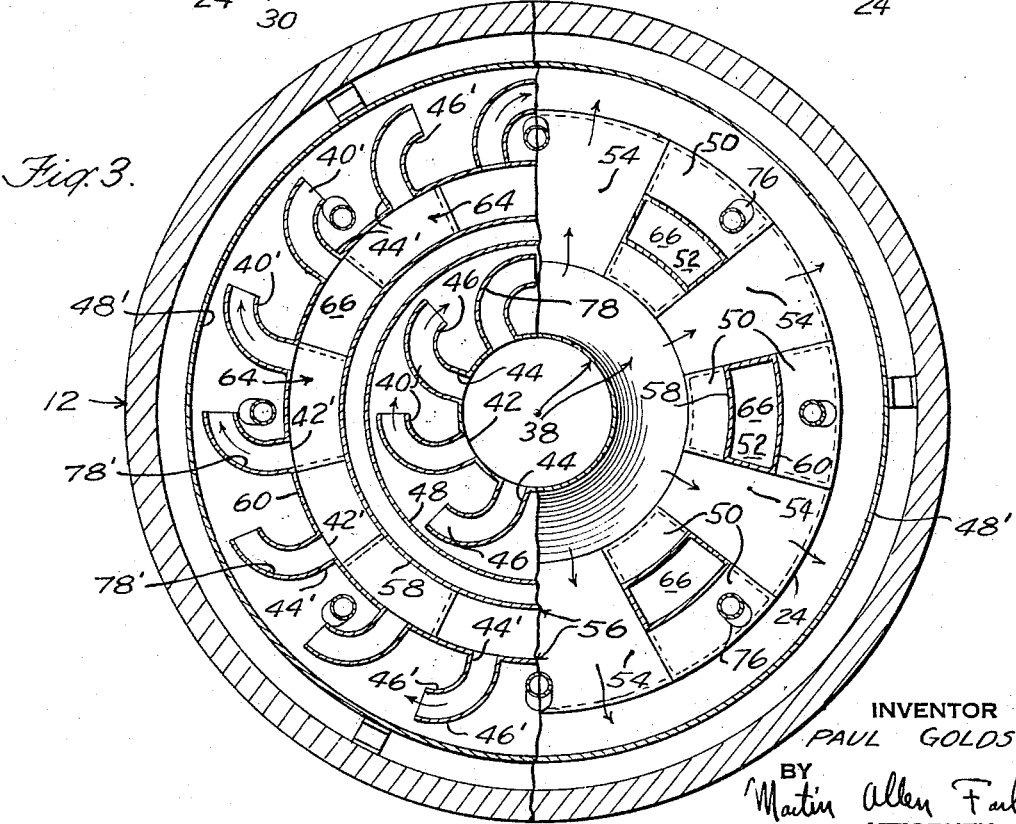

3,314,220
MULTIANNULAR CENTRIFUGAL SEPARATOR
Paul Goldstein, Creskill, N.J., assignor to Foster Wheeler Corporation, New York, N.Y., a corporation of New York
Filed Mar. 22, 1965, Ser. No. 441,810
6 Claims. (Cl. 55—343)

This invention relates to liquid-vapor separators, and more particularly, to centrifugal type liquid-vapor separators for use with reduced size separator vessels and/or relatively high capacity units.

The size and cost of separator vessels containing liquid-vapor mixtures are of primary importance in the economical manufacture of vapor generators. Smaller vessels are cheaper; easier to fabricate, ship and install; and provide efficient utilization of space. Larger vessels are expensive, if not impossible to build and transport.

These disadvantages are particularly serious today in view of the demands for higher capacity units which ordinarily call for large vessels.

Cost and fabrication disadvantages dictate that vessel size be made as small as practicable notwithstanding that smaller vessels increase the release rate, i.e., the mixture flow per unit cross-sectional area, and hinder separation caused by gravity by entraining liquid along with flow. Consequently, resort is made to special separation equipment which compensates for reduced gravity separation.

The vessels may be made as small as the efficiency of the separating equipment will permit. Centrifugal type liquid-vapor separators have been found to be extremely efficient with vapor generators to reduce the liquid or moisture content of a generated liquid-vapor mixture.

Basically, these centrifugal separators comprise a single upright cylindrical baffle into and against which a plurality of high velocity tangential streams of a generated liquid-vapor mixture are directed. The heavier liquid is centrifuged out around the baffle while the lighter vapor moves inwardly forming a separate inner layer, the separated liquid descending along the baffle and the vapor rising upward.

The baffle is located in the separator vessel above the generator, the generated liquid-vapor mixture initially rising into a riser cylinder which is concentrically oriented within the baffle. From the riser, the mixture is directed against the baffle by circumferentially located ports in the riser and directing arms communicating with the ports consisting of vanes or nozzles, the configuration of the ports and directing arms determining the tangential orientation of the liquid-vapor streams relative the baffle.

It has been found that in this type of separator, efficiency of separation is achieved by a riser arm velocity below a maximum allowable velocity. A higher arm velocity reduces the separation efficiency due to a variety of factors including arm configuration, spacing, pressure and secondary entrainment of centrifugally separated liquid. A lower arm velocity increases the separation efficiency since gravity aids separation at the baffle.

However, with these separators, arm velocity may not be made as low as desired. The arm velocity is a function of the size and number of the arms and ports, the more arms and ports and the larger their size, the lower the arm velocity. The number of arms and ports that may be placed on the riser is limited by the size of the vessel. Furthermore, an increase in the size of the arms and ports by a vertical enlargement of the ports is undesirable as it would increase the length of the separator unit or lower the ports dangerously close to the liquid level and adversely affect performance by requiring a change in cross-section of the arms.

In designing a vessel for use with such centrifugal separating equipment, the vessel is initially sized utilizing a release rate obtained from test data. This rate is a function of the fluids to be separated, respective quantities of each phase, pressure, and is based on the assumption that the arm velocity and dryer loading are not greater than maximum allowable velocities which have also been determined from test data.

It has been found that in steam-water generators under 250,000 lbs./hr. the maximum allowable arm velocity can be achieved in economically sized vessels. In higher capacity generators, a point is reached where the allowable release rate has to be reduced due to the fact that the vessels would have to be made excessively large in order to accommodate the required number of separator arms.

For example, by increasing the capacity or throughput of a unit, the flow velocities at all points in the unit are increased. The arm velocity goes up and the release rate rises. Therefore, the vessel size has to be increased to lower the release rate and the arm velocity.

However, since the cross-sectional area of the vessel increases by the square of its radius while the circumference of the riser increases by the radius itself, beyond a certain point, the maximum allowable arm velocity cannot be obtained although the vessel is resized for the required release rate. Therefore, the vessel size must be further increased to provide sufficient space therein to add arms and ports so as to sufficiently lower the arm velocity. As a result, the vessel release rate is unreasonably reduced, the vessel cost increases and the efficiency suffers.

Accordingly, the present invention provides a centrifugal liquid-vapor separator of compact design which may be efficiently utilized with reduced size separator vessels. The liquid-vapor separator of the present invention comprises a concentric arrangement of central and outer centrifugal separator assemblies, each having a riser with ports and arms and an associated baffle. The outer risers are annular in configuration and provide for a sufficient increase in total riser circumference relative the cross-sectional area of the vessel. Additional arms and ports may be placed so as to reduce the arm velocity to at least the maximum allowable velocity. In large capacity systems, the vessel does not have to be oversized with respect to the vessel release rate. Vessel size may be further reduced, even in low capacity units, as lower obtainable arm velocities provide more efficient separation, thereby permitting operation with higher vessel release rates and smaller vessels than heretofore achieved. Flow through the central and outer risers is easily adjusted to correct proportions. In addition, the arrangement provides further savings in vertical space and a consequent reduction in pressure loss which would otherwise occur if the port size were increased vertically.

The present invention also has applications to spherical boiler drums found in large super charged boilers and to once-through boiler units. During start-up of a once-through boiler, a steam-water mixture would be delivered to the turbines if a flash-tank was not present in the start-up by-pass system. Using conventional separating techniques, costly pressure vessels are required which take up considerable space. The high duty separator of the present invention is conveniently adapted to a flash-tank in a once-through boiler system. The steam-water mixture entering the separator is centrifuged and separated into heavier water particles which are forced to the baffles and tank sides and to the feed water heater, and into lighter steam which rises to the top of the vessel and is delivered to the turbines. This type separator provides a high steam release rate at very moderate pressure drop and makes possible a reduction in both the size and cost of the flash-tank.

Other advantages of the present invention will appear more fully from a detailed description in conjunction with the accompanying drawings of a preferred embodiment of the invention of which:

FIGURE 1 is a vertical central sectional view with certain parts broken away of a vapor generator which incorporates the liquid-vapor separator of the present invention;

FIGURE 2 is an enlarged view of the liquid-vapor separator of FIG. 1; and

FIGURE 3 is a sectional view taken along the line 3—3 of FIG. 2.

Referring now to FIG. 1, the generator comprises an upright cylindrical vessel 12, with dome ends 14 and 16. A tube sheet 18 is provided in the lower end of the vessel dividing the vessel into upper and lower areas, the lower area containing inlet and outlet connections 20 and 22 for the flow of a hot fluid into and out of the vessel. The upper area is divided by a cylindrical shell or shroud 24 into a downcomer passageway 26 and a vapor generation chamber 28. A bundle of inverted U-tubes 30 is provided in the chamber secured at the ends of the tubes to the tube sheet 18 and is in communication with the hot fluid inlet and outlet connections 20 and 22 for circulation of the heating fluid.

The bottom edge of the cylindrical shroud engages the tube sheet and is provided with openings 32 between the lower end of the downcomer passageway and the lower part of the vapor generation chamber by which feed-water entering the vessel and water separated from steam generated within the shroud may be returned to the lower end of the tube bundle in continuous circulation.

The upper end of the shroud is joined to a central riser section 34 of reduced diameter closed at its top by a plate 36. Section 34 includes a cylindrical central riser 38, which is concentrically disposed relative the vessel 12. The shroud is connected by riser section 34 to centrifugal steam and water separator nozzles 40 at the upper part of the central riser. As shown in FIG. 3, the separator nozzles are spaced annularly at equal intervals around the riser and are of conventional design, more specifically, as described in U.S. patent application, Ser. No. 350,066 for Vapor-Liquid Separator, by E. L. Daman et al., filed on Mar. 6, 1964.

The separator nozzles are radially and outwardly connected to the central riser about the edge of circumferentially aligned ports 42 formed in the riser at the same height and comprise a straight portion 44 normal to the riser which merges into an arcuate shaped portion 46. The arcuate portion is directed tangentially toward an open-ended cylindrical baffle 48 concentrically disposed about the central riser and nozzles.

Referring now to FIG. 2, vertically disposed conduits 50 extend upward from the central riser section 34, about spaced openings 52 in frusto conical wall 54, to a cylindrical annular riser 56. The annular riser 56 is concentrically disposed about baffle 48 and comprises inner and outer walls 58 and 60, a closed upper end 62 and a lower wall 64. The upper ends of the conduits 50 are connected to this lower wall about spaced inlet openings 66, the annular riser thereby being in flow communication with the central riser and shroud. Inner wall 58 includes an upper cylinder portion 68 which extends beyond the upper edge of baffle 48.

Adjacent the upper end of the annular riser are a plurality of annularly arranged centrifugal steam and water separator nozzles 40'. These nozzles are radially and outwardly connected to the annular riser about circumferentially aligned, radially-outward facing ports 42' formed in the outer wall of the annular riser. Each nozzle comprises a straight portion 44' and an arcuate shaped portion 46' being similar in design to those associated with the central riser. Portion 44' extends normal to the annular riser and merges into arcuate portion 46' which is directed tangentially toward an open-ended cylindrical baffle 48' concentrically disposed adjacent the annular riser and nozzles 40' and the vessel wall.

Disposed above the risers and associated nozzles and baffles are a plurality of dryers 70 (FIG. 1) of the Chevron type. Further details on the Chevron-type dryer are shown in U.S. Patent No. 2,675,888, of J. Blizard et al. A conduit 72 is connected to the top of each dryer and extends through a plate 74 secured at its edge to the top of the vessel 12. Liquid drains 76 extend from the bottom of the dryers to below the water level which is maintained beneath the lower edge of the nozzles.

Considering now the operation of the structure described, the passage of the hot fluid through the tube bundle in the vapor generation chamber 28 generates steam from the feed-water entering the chamber from downcomer passageway 26. A mixture of steam and water passes up the vapor generation chamber and is divided into flow up through the central riser 38 into the steam and water separator nozzles 40 and up through the conduits 50 and annular riser into the steam and water separator nozzles 40'.

The operation of the separator nozzles and the associated baffles 48 and 48' of both the central and annular riser, respectively, are identical. The pressure within the risers is greater than the pressure outside the risers causing the mixture to be directed through the nozzles with great force thereby imparting a high angular velocity to the mixture in the arcuate portions of the nozzles. The centrifugal force thereby created effects an initial centrifuging and partial separation of the steam and water while the mixture passes through the nozzles, the liquid moving to outer radial portions 78 or 78' (FIG. 3) of the nozzles and the steam moving inwardly. The partially separated mixture is directed by the nozzles with high velocity tangentially toward the adjacent baffle 48 or 48' with the partially separated liquid from the outer radial portions 78 or 78' being directed against the baffle as an outer layer, while the partially separated vapor is directed as an inner layer. This partially separated mixture whirls around the baffles and a centrifugal force is created adjacent the baffles causing additional separation within the baffles, more liquid moving toward the baffles and descending, and vapor moving inwards and rising.

Some liquid may be carried upward by the rising steam currents within the baffles forming a secondary mixture of steam and water which passes over the upper edges of the baffles 48 or 48'. This mixture is directed tangentially outward onto adjacent secondary cylindrical baffles comprising the upper cylindrical portion 68 and the wall of vessel 12 by the outward force from the nozzles 40 and 40', respectively. A centrifugal force is produced on the secondary cylindrical baffles and some of the entrained liquid separates out and flows downward. The region between baffle 48 and inner cylinder 58, and the region between baffle 48' and the vessel wall, respectively, are shielded from the nozzles by the baffles thereby being dead regions having no appreciable upward steam component to resist liquid separation and downflow.

In FIGS. 1 and 2, the upward arrows represent separated steam flow or steam and water mixture flow and the downward arrows represent separated water flow.

The separated water from the outer annular portion of the separator assembly comprising the annular riser 56, nozzles 40', baffle 48' and the vessel wall, descends along baffle 48' and the vessel wall, as indicated by the downward arrows, into the water located on the outside of the shroud. The separated water from the central portion of the separator assembly comprising the central riser 38, nozzles 40, baffle 48 and the inner cylinder 58 descends along baffle 48 and inner cylinder 58 and passes through the alternating regions between the conduits 50 into the water as shown in FIG. 2, and as shown in FIG. 3 on the right-hand side by the radial arrows representing water flow.

The steam rising from all portions of the separator assembly passes into the large open central region above the upper cylindrical portion 68 and enters the dryers 70 where it is further separated from any residual water. The large open central region lowers the velocity of the rising steam providing a degree of gravity separation. The dried steam exits from the dryers through conduits 72 and flows into the space between plate 74 and the top of the vessel 12 for discharge through vapor outlet conduit 80. The liquid which is separated in the dryers passes downward through drain 76 into the feed-water.

Although the invention has been described in its preferred form with a certain degree of particularity, it is understood that the present disclosure of the preferred form has been made only by way of example and that numerous changes may be restored to without departing from the spirit and the scope of the invention as hereinafter claimed.

What is claimed is:

1. A liquid-vapor separator comprising:
a vessel having cylindrical vessel walls defining a separator interior region and having a closed upper vessel end defining a vapor discharge port;
an upright central cylindrical riser disposed concentrically within the separator interior region, said riser closed at its upper end, said riser formed with a series of evenly-spaced ports about the periphery of the riser adjacent its upper end;
a plurality of radially disposed horizontal central nozzles, each radially disposed horizontal central nozzle communicating with one of said ports and having an arcuate end defining a central nozzle discharge opening, the central nozzle discharge openings of said radially disposed horizontal central nozzles forming a concentric circle about said central riser;
an upright annular riser disposed concentrically about said central riser in spaced relationship about said central nozzles, the annular riser including a cylindrical innermost wall adjacent said central nozzles defining with the central riser an open-ended innermost annular separating channel within the separator interior region, the annular riser also including a cylindrical outermost wall spaced concentrically about the innermost wall, said annular riser further including an annular cover disposed at the upper end of the annular riser closing the annular riser between the innermost and outermost walls, said outermost wall formed with a series of evenly-spaced outer ports about the periphery of the outermost wall adjacent the upper end of the annular riser;
a plurality of radially disposed horizontal outer nozzles, each radially disposed outer nozzle communicating with one of said outer ports and having an arcuate end defining an outer nozzle discharge opening, the outer nozzle discharge openings of said radially disposed outer nozzles forming a concentric circle about said annular riser, the outer nozzle discharge openings in spaced relationship from the vessel walls, the outermost wall in spaced relationship from the vessel wall and defining therewith and therebetween an open-ended outermost annular separating channel within the separator interior region;
a central open-ended cylindrical baffle concentrically located in the innermost annular separating channel about and in spaced relationship from the central nozzles and within and in relatively closely spaced relationship from the innermost wall of the annular riser, said central baffle having a central baffle upper edge, said innermost wall having an innermost wall upper edge, said innermost wall upper edge vertically higher than the central baffle upper edge, said central baffle upper edge and said central riser upwardly extending to approximately the same vertical height;
an outer open-end cylindrical baffle concentrically located in the outermost annular separating channel about and in spaced relationship from the outer nozzles and within and in relatively closely spaced relationship from the vessel wall, said annular riser and outer baffle extending upwardly to approximately the same vertical height;
said baffles extending in the downward direction to below the adjacent nozzles;
inlet means for passing a liquid-vapor mixture into the central and annular risers below the ports;
said risers disposed in the separator interior region in spaced vertical relationship from the vapor discharge port, said separator interior region immediately above the upper ends of the baffles being a substantially open-spaced vapor region, said open-spaced vapor region in communication with the open-ended innermost annular separating channel and the open-ended outermost annular separating channel at the open-ended upper ends of said channels;
said separator interior region including a liquid region adjacent the lower ends of said risers, said liquid region in communication with the open-ended innermost annular separating channel and the open-ended outermost annular separating channel at the open-ended lower ends of said channels.

2. A liquid-vapor separator according to claim 1 further comprising drying means located adjacent said vapor discharge port above said open-spaced vapor region.

3. A liquid-vapor separator according to claim 2 wherein said drying means comprises a plurality of Chevron-type dryers.

4. A liquid-vapor separator according to claim 2 wherein said central riser, central baffle, annular riser and outer baffle extend upwardly to approximately the same height, said innermost wall upper edge extending upwardly beyond the upper end of the annular riser.

5. A liquid-vapor separator according to claim 4 further comprising connection means between the risers located below the ports for connecting the risers in fluid communication.

6. A liquid-vapor separator according to claim 5 wherein the connection means includes a plurality of circumferentially arranged conduits.

References Cited by the Examiner

UNITED STATES PATENTS

| | | | |
|---|---|---|---|
| 2,317,101 | 4/1943 | Lecky | 261—79 |
| 2,421,705 | 6/1947 | Kasten | 55—484 X |
| 3,053,029 | 9/1962 | DeSeversky | 55—139 X |
| 3,068,629 | 12/1962 | Jones | 55—349 |
| 3,195,515 | 7/1965 | Blizard | 122—34 |
| 3,209,731 | 10/1965 | Schonberger et al. | |
| 3,247,650 | 4/1966 | Kornbichler | 55—342 X |

FOREIGN PATENTS 935,147   8/1963   Great Britain.

HARRY B. THORNTON, *Primary Examiner.*

ROBERT F. BURNETT, *Examiner.*

D. K. DENENBERG, *Assistant Examiner.*